United States Patent [19]
Morin et al.

[11] Patent Number: 4,770,237

[45] Date of Patent: Sep. 13, 1988

[54] PROCESS FOR CIRCULATING SOLID PARTICLES WITHIN A FLUIDIZATION CHAMBER AND FLUIDIZATION CHAMBER FOR CARRYING OUT THE PROCESS

[75] Inventors: Jean X. Morin; Michel Marcellin, both of Le Creusot, France

[73] Assignee: Framatome & Cie., Courbevoie, France

[21] Appl. No.: 725,288

[22] Filed: Apr. 19, 1985

[30] Foreign Application Priority Data

Apr. 20, 1984 [FR] France ................................ 84 06294

[51] Int. Cl.⁴ ............................................. F28D 13/00
[52] U.S. Cl. ......................... 165/104.16; 165/104.18; 422/146; 122/4 D; 34/57 A
[58] Field of Search ..................... 165/104.16, 104.18; 34/57 A; 422/146, 145, 147; 122/4 D

[56] References Cited

U.S. PATENT DOCUMENTS

| | | | |
|---|---|---|---|
| 2,584,391 | 2/1952 | Leffer | 422/147 |
| 2,698,171 | 12/1954 | Schoenmakers | 165/104.18 |
| 4,191,544 | 3/1980 | Boll et al. | 422/147 |
| 4,296,800 | 10/1981 | Johnson | 165/104.16 |
| 4,550,769 | 11/1985 | Bhojwani et al. | 165/104.18 |

FOREIGN PATENT DOCUMENTS 95193  6/1983  Japan ............................... 165/104.18

Primary Examiner—Albert W. Davis, Jr.
Attorney, Agent, or Firm—Pollock, Vande Sande & Priddy

[57] ABSTRACT

A process for circulating solid particles within a fluidization chamber, in which is formed a circulating fluidized bed comprising a dense lower zone (A) with a high concentration of particles, above which is located a dilute zone (B) containing particles carried along by the rising stream of a gas towards the upper part of the chamber (1), the latter opening into a circuit (4) for discharging the gases and particles, incorporating a device (41) for recovering the particles carried along, which is connected to the chamber (1) by means of a circuit (45) for recycling the recovered particles. In the upper part (12) of the fluidization chamber, the circulation speed of the cases is reduced before their discharge, so as to produce above the dilute zone (B) an upper zone (C) with a higher concentration of particles, in which some (35) of the particles escape from the stream of gas and fall in a shower along the side wall of the chamber, at the same time forming a descending annular film (34). The improved fluidization chamber for carrying out the process applies particularly to the combustion and/or gasification of combustible material.

5 Claims, 1 Drawing Sheet

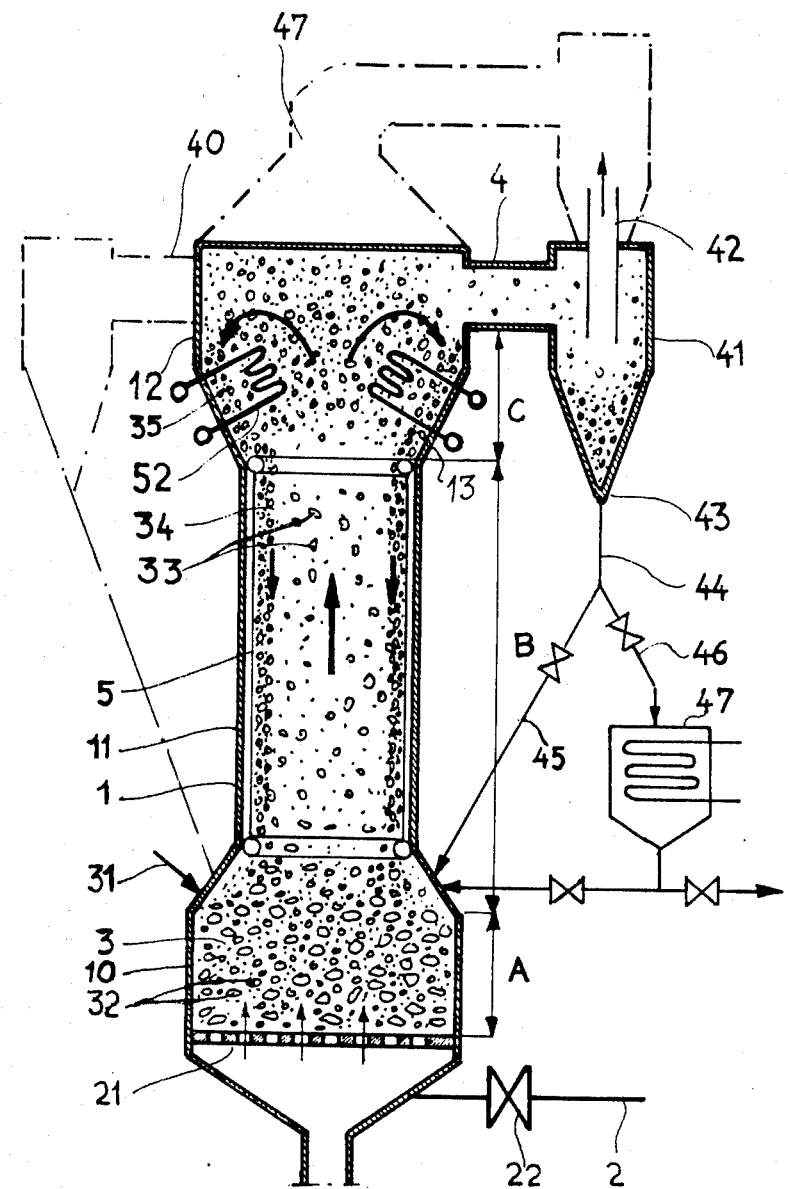

PROCESS FOR CIRCULATING SOLID PARTICLES WITHIN A FLUIDIZATION CHAMBER AND FLUIDIZATION CHAMBER FOR CARRYING OUT THE PROCESS

FIELD OF THE INVENTION

The invention relates to a process for circulating solid particles within a fluidization chamber and also covers the fluidization chamber for carrying out the process.

BACKGROUND OF THE INVENTION

The fluidized-bed method has long been used for generating heat or, in more general terms, for the treatment of granular materials in the form of particles of relatively small dimensions. Treatment is carried out inside a fluidization chamber consisting of a vertical elongate enclosure which is fed with solid materials in the form of particles and at the base of which is injected a fluidization gas which circulates upwards at sufficient speed to place the particles in suspension, the critical fluidization speed depending on the size and density of the particles.

Because of the high conversion yield, fluidized beds are used particularly for the combustion or gasification of hydrocarbon materials, such as coal, lignite, wood, etc. If, for example, coal is burnt in a boiler, the latter can consist of an enclosure of large dimensions, comprising a lower part in which combustion takes place in fluidized beds, and an upper part through which pass the hot gases produced by combustion and in which a bank of heat-exchanger tubes is located.

Other treatments can also be carried out in fluidized beds, and to increase the efficiency of the treatment, the gases can be circulated at considerable speed, for example at a speed greater than 2 m/s. In this case, a substantial proportion of particles is conveyed upwards together with the gases, and it is possible to distinguish within the fluidization chamber a dense lower zone with a high concentration of particles, above which there is a dilute zone containing a large proportion of particles conveyed together with the gases towards the upper part of the chamber, the latter opening into a discharge circuit for the gases and particles carried along. The discharge circuit then passes through a device for recovering the particles carried along, usually of a cyclone type, which comprises an upper outlet for the clean gases and a lower outlet for the recovered particles, the latter being connected to the fluidization chamber by means of a circuit for recycling the particles in the fluidized bed.

Most treatments involve exothermic reactions and justify the recovery of heat by the use of an exchanger consisting of a bank of tubes, through which a heatexchange fluid passes and which is placed in contact with the hot gases and/or the particles. In conventional fluidized-bed boilers, the rate of circulation of the fluidization gas is adjusted in such a way that only the fine ashes can be carried along with the gases. It is then possible to place the heat exchanger without danger in the dilute zone above the dense fluidized bed. In contrast, if circulating-bed operation is used and if a heat exchanger is placed inside the reaction chamber, in the dilute zone of the fluidized bed, the usually abrasive particles carried along by the gases in this zone cause rapid wear of the exchanger, which also impedes the rising circulation of the gases and the carrying along of the particles. This disadvantage can be reduced by the use of a tubular exchanger consisting, for example, of a membranous wall placed along the side wall of the enclosure, of which it can moreover form the inner face, the latter being covered on the outside with a refractory covering. In this case, the heat exchanger does not impede the circulation of the gases, but it is likewise in contact with a fairly small proportion of hot solid particles, most of which are conveyed upwards in the central part of the enclosure, and then the amount of heat recovered is fairly small.

Moreover, the combustion reaction continues in the dilute zone over a height which depends on the quality and particle size of the fuel, taking into account the fluidization rate. The heat exchanger located in this zone can consequently be subjected to excessive corrosion there.

Therefore, when circulating-bed operation is used, it is generally preferred to place the heat exchanger outside the fluidization chamber, for example in the particle recycling circuit.

SUMMARY OF THE INVENTION

The subject of the invention is a process for circulating the particles within the fluidization chamber, making it possible to carry out under good conditions an internal recovery of the heat of the fluidized bed.

On the other hand, even when there is no particular desire to recover the heat, the treatment efficiency is linked to the transit time of the particles in the fluidized bed and consequently to their circulation speed. When fluidized-bed operation is used, there is a certain amount of closed-circuit circulation of the particles within the fluidization chamber, some particles being carried rapidly towards the discharge circuit, whereas others fall back into the fluidized bed. However, these movements are haphazard, and there are no means of controlling them in order to improve efficiency.

On the other hand, the invention makes it possible to achieve an orderly circulation of solid particles within the fluidization chamber, so as to improve the treatment efficiency and increase the filling rate of the fluidization chamber and consequently to utilize the capacity of the latter to an optimum extent. Furthermore, the invention makes it possible to provide inside the fluidization chamber clearly separated zones in which, in a general way, the particles can undergo different treatments or reactions.

According to the invention, in the upper part of the fluidization chamber, the circulation speed of the gases before their discharge is reduced, so as to produce above the dilute zone of the fluidized bed an upper zone with a higher concentration of particles, in which some of the particles escape from the stream of gas and fall in a shower along the side wall of the chamber, at the same time forming a descending annular film.

When an internal recovery of heat is to be carried out, the annular film of particles is made to descend along a tubular heat exchanger located inside the fluidization chamber, at least in the dilute zone of the fluidized bed.

In a preferred embodiment, the speed of the stream of gas is reduced by widening the passage cross-section of the gases in the upper part of the fluidization chamber. Preferably, the passage cross-section of the gases in the fluidization chamber is varied from top to bottom, so as to form within the latter a lower zone of wide cross-section delimiting the dense part of the fluidized bed, a middle zone of narrowed cross-section corresponding to the dilute part and an upper zone of widened cross-section corresponding to the concentrated upper part for forming the annular film of particles. The rising circulation speed of the stream of gas is preferably from 6 to 12 m/s in the middle part of the chamber and from 2 to 6 m/s in the upper part where the particles are concentrated.

The invention also covers an improved fluidization chamber for carrying out the process, which is equipped in its upper part with a means of reducing the circulation speed of the gases before their discharge from the chamber, this means preferably consisting of a widening of the cross-section of the chamber in the upper part of the latter.

BRIEF DESCRIPTION OF THE DRAWING

The invention will be understood more clearly from the following description of a particular embodiment given by way of example, with reference to the attached FIGURE which shows diagrammatically, in axial section, an improved fluidization chamber according to the invention.

DETAILED DESCRIPTION

The fluidization chamber 1 consists of an elongate vertical enclosure, into the base of which opens a circuit 2 introducing a fluidization gas distributed uniformly over the entire cross-section of the enclosure 1, for example by means of a fluidization grid 21.

The gas supply circuit 2 is provided with flow adjustment means 22 which make it possible to control the speed of the rising stream of gas within the enclosure 1. The latter contains a solid material in the form of particles 3, introduced via a feed circuit 31. When the speed of the rising stream of gas exceeds a critical speed depending on the mean particle size and the density of the particles 3, these are placed in suspension to form a fluidized bed. According to a known operating mode, the circulation speed of the gases is sufficient to ensure that the fluidized bed is of the circulating type. In this case, the largest particles 32 are simply lifted by the gases, but most of the particles 33 of medium and fine particle size are capable of being carried upwards by the rising stream of gas. It is then possible to distinguish within the enclosure 1 a dense zone A, containing a high concentration of solid particles, and a dilute zone B, containing a smaller, but still appreciable proportion of solid particles carried along together with the gases. In its upper part, the enclosure 1 opens into a circuit 4 for discharging the gases and particles carried along, which pass through a particle recovery device 41 consisting, for example of one or more cyclones comprising an upper outlet 42 for the clean gases and a lower outlet 43, opening into an outlet pipe 44 which supplies a circuit 45 for recycling the particles recovered in the fluidized bed and which can incorporate a branch 46 for discharging some of the particles for another use.

To recover the internal heat of the particles, when these undergo an exothermic reaction, it is expedient to convey them through a heat exchanger 47 which can be placed in the recycling circuit 45 or, as shown in the FIGURE, on the take-off branch 46. As is customary when low fluidization speeds are used, a tubular exchanger 5 is placed in the dilute zone B of the fluidized bed and can form the inner wall of the fluidization chamber 1.

According to an essential characteristic of the invention, the circulation speed of the stream of gas in the upper part of the enclosure 1 is reduced, before the gases are discharged via the pipe 4. For this purpose, the upper part 12 of the enclosure 1 has a widened cross-section and is connected to the side wall 11 by means of a truncated wall 13, so as to form above the dilute zone B of the fluidized bed an upper zone C, in which the circulation speed of the gases is lower, thus causing an increase in the concentration of particles. In this concentrated zone C, some particles 35, especially the heaviest ones, tend to escape from the stream of gas, particularly along the side wall 12 where the speed is more restricted. A concentrated layer of particles 35 thus forms along the side wall 12, and these reduce their speed, then descend again and fall into the dilute zone B, forming an annular film 34 descending in a shower along the tubular exchanger 5 and then returning into the dense zone A of the fluidized bed. The slope of the connecting wall 13 is matched to the particle size and to the desired degree of recirculation.

In this way, the heat exchanger 5 is brought in contact with a dense layer of particles which are continually renewed and which, until they arrive along the exchanger, remain at the high temperature prevailing in the enclosure 1 as a whole. It is known, in fact, that in circulatingbed operation the entire fluidization chamber is substantially at the same temperature. This uniform descending movement of the particles along the exchanger subjects the latter to less wear than the haphazard movements of particles rising in the central part of the enclosure 1, the exchanger 5 being, moreover, protected from the impact of particles coming from the central part by the relatively dense film 34 of falling particles.

For the same reason, it is possible to place in the upper zone C of the chamber 1 heat exchangers 52 which, because of the reduction in speed obtained in this zone, will be protected from the impact of high-speed particles coming from the dilute zone B, these being damped as a result of the increase in concentration of the particles produced in zone C.

By means of these arrangements, the fluidization chamber is divided into three zones, namely the dense lower zone A in which combustion takes place, the dilute zone B where heat exchange occurs, and the upper zone C of higher concentration, in which the falling film 34 forms and where a transfer of heat can also take place.

Thus, even during circulating-bed operation, it is possible to carry out combustion and heat exchange in the very interior of the reaction chamber and therefore with greater efficiency, but in clearly separated zones, thus making it possible to reduce the risk of wear and corrosion of the heat exchangers. In fact, even if combustion still continues in the dilute zone B, particularly in a circulating bed, the heat exchanger 5 located there is protected not only from the impact of particles, but also from the corrosive effects of combustion by the dense film 34 of descending particles. Furthermore, the height of the zone B can be determined as a function of the quality and grain size of the particles and the fluidization speed, so that combustion is practically completed on entry to the upper zone C.

To increase the separation effect of the zones, it is advantageous to give the fluidization chamber the form illustrated in the FIGURE, which comprises a wide cross-section in the lower part 10, then narrowing in the middle part 11 and widening again in the upper part 12. Thus, the three superimposed zones of the fluidized bed are delimited in a relatively precise way, and the increase in speed in the middle zone is caused by the narrowing of the passage cross-section of the gases and, if appropriate, the injection of a fluidizing agent. This clear separation between the lower combustion zone A and the upper heat-transfer zone B, C makes it possible to control the operation of the fluidized bed more effectively. It will also be noted that the presence of a more concentrated zone in the upper part of the fluidization chamber and of a dense annular layer of particles trickling along the side wall of the enclosure makes it possible to increase the overall density of the fluidized suspension and consequently the performances of the reaction chamber, bearing in mind its dimensions.

The invention has been described essentially in terms of the aim of increasing the transfer of heat within the chamber, but the arrangements described make it possible, in general terms, to carry out a treatment with the highest possible efficiency by means of the intense circulation of particles in the very interior of the reactor, without passing through the recycling circuit.

Furthermore, because the interior of the reactor is separated into sharply defined zones, the particles could undergo different treatments or reactions there according to the zones.

The invention is not limited to the embodiment just described, but covers the improvements or alternative forms which could be conceived when the same principles are applied.

Thus, it could be considered expedient, after the speed of the stream of gas in the upper part 12 of the enclosure has been reduced, to discharge the gases through an outer orifice 40 located in the axis of the enclosure, the discharge circuit 4 then having the form represented by dot-and-dash lines in the FIGURE.

On the other hand, to promote the stability of the dense upper zone C of the fluidized bed, it could be useful to discharge the gases symmetrically, for example in two or more discharge circuits 4 and 40, each incorporating a particle recovery device opening into a circuit for recycling the particles in the fluidized bed.

Finally, to increase the circulation speed of the gases in the dilute zone B and reduce it in the upper zone C, it is simpler to act on the passage cross-section of the stream of gas, but it would also be possible to use other means, for example injecting an auxiliary fluid or taking off a certain flow of gas at the desired height.

We claim:
1. A process for circulating solid particles within a single vertical fluidization chamber (1) which is fed with solid material in the form of particles (3) and at the base of which a fluidization gas is injected at a sufficient speed to form a circulating fluidized bed comprising a dense lower zone (A) with a high concentration of particles, above which is located a dilute zone (B) containing particles carried along by the rising stream of gas towards the upper part of the chamber (1), the latter opening into a circuit (4) for discharging the gases and particles, in which is located a means (41) of recovering the particles carried along, which is connected to the fluidization chamber (1) by means of a circuit (44, 45) for recycling the recovered particles, including the step of reducing the circulation speed of the gases before their discharge in the upper part of the fluidization chamber (1), so as to produce above the dilute zone (B) of the fluidized bed an upper zone (C) with a higher concentration of particles, in which some of the particles escape from the stream of gas and fall in a shower along the side wall of the chamber, at the same time forming a descending annular film (34).

2. A process according to claim 1,
wherein the annular film (34) of particles is made to descend along a tubular heat exchanger (5) located inside the fluidization chamber (1), at least in the dilute zone (B) of the fluidized bed.

3. A process according to claim 1,
including the step of reducing the speed of the stream of gas by widening the passage cross-section of the gases in the upper part of the fluidization chamber (1).

4. A process according to claim 3,
including the step of the passage cross-section of the gases in the fluidization chamber varying from top to bottom, so as to form within the latter a lower zone (A) of wide cross-section delimiting the dense part of the fluidized bed, a middle zone (B) of narrowed cross-section corresponding to the dilute part and an upper zone (C) of widened cross-section corresponding to the concentrated upper part for the formation of the annular film (34).

5. A process according to claim 1,
wherein the rising circulation speed of the stream of gas is from 6 to 12 m/s in the middle part of the chamber and from 2 to 6 m/s in the upper part where the particles are concentrated.

* * * * *